(12) United States Patent
Jarvis et al.

(10) Patent No.: US 11,858,637 B2
(45) Date of Patent: *Jan. 2, 2024

(54) UNMANNED AERIAL VEHICLE AND CARGO ATTACHMENT SYSTEM FOR THE UNMANNED AERIAL VEHICLE

(71) Applicant: The Boeing Company, Chicago, IL (US)

(72) Inventors: Joshua B. Jarvis, St. Louis, MO (US); Roger W. Lacy, Philadelphia, PA (US); Brian Charles Gray, St. Louis, MO (US); David H. Mason, Glenmoore, PA (US); Douglas Mikita, Philadelphia, PA (US); Justin Fowler Rogers, Ridley Park, PA (US); Brandon Brown, Malvern, PA (US); Eric Hathaway, Philadelphia, PA (US); Eric J. Schulze, Hockessin, DE (US); Corey Seidel, Marthasville, MO (US)

(73) Assignee: The Boeing Company, Arlington, VA (US)

(*) Notice: Subject to any disclaimer, the term of this patent is extended or adjusted under 35 U.S.C. 154(b) by 781 days.

This patent is subject to a terminal disclaimer.

(21) Appl. No.: 16/784,906

(22) Filed: Feb. 7, 2020

(65) Prior Publication Data

US 2021/0245881 A1 Aug. 12, 2021

(51) Int. Cl.
*B64D 1/22* (2006.01)
*B64C 39/02* (2023.01)
*B64D 1/12* (2006.01)
*B64U 10/13* (2023.01)
*B64U 30/20* (2023.01)
*B64U 101/60* (2023.01)

(52) U.S. Cl.
CPC .............. *B64D 1/22* (2013.01); *B64C 39/024* (2013.01); *B64D 1/12* (2013.01); *B64U 10/13* (2023.01); *B64U 30/20* (2023.01); *B64U 2101/60* (2023.01)

(58) Field of Classification Search
CPC ... B64D 1/22; B64D 1/12; B64D 1/08; B64D 1/02; B64D 9/00; B64C 2201/128; B64F 1/32; B64U 2101/60
See application file for complete search history.

(56) References Cited

U.S. PATENT DOCUMENTS

| 4,378,919 | A | * | 4/1983 | Smith | B64D 1/22 |
| | | | | | 294/81.4 |
| 6,533,220 | B2 | * | 3/2003 | Schuster | B64D 1/22 |
| | | | | | 244/137.4 |
| 9,205,922 | B1 | * | 12/2015 | Bouwer | B64C 37/02 |

(Continued)

*Primary Examiner* — Joshua J Michener
*Assistant Examiner* — Arfan Y. Sinaki
(74) *Attorney, Agent, or Firm* — McDonnell Boehnen Hulbert & Berghoff LLP

(57) ABSTRACT

Example methods and systems for coupling and controlling transport of cargo using an unmanned aerial vehicle (UAV) are provided, comprising coupling at least one electronically-controllable attachment device positioned on an underside of the UAV to a sling cable, the sling cable being secured to the cargo. The UAV flies to a predetermined area above the cargo, and responsive to determining that the UAV is positioned within the predetermined area, the UAV elevates above the initial operating height to lift the cargo and navigates to a target location.

20 Claims, 11 Drawing Sheets

(56) References Cited

U.S. PATENT DOCUMENTS

| | | | |
|---|---|---|---|
| 9,223,008 B1 | 12/2015 | Hartman et al. | |
| 2002/0171008 A1* | 11/2002 | Schuster | B64D 1/22 |
| | | | 244/118.1 |
| 2015/0360779 A1* | 12/2015 | Behrens | B64D 1/22 |
| | | | 244/137.4 |
| 2016/0236779 A1* | 8/2016 | Thomas | B64D 1/22 |
| 2018/0111687 A1* | 4/2018 | Thomas | B64D 1/22 |
| 2018/0370618 A1* | 12/2018 | Harris | B64C 25/24 |
| 2019/0233254 A1* | 8/2019 | Shin | B64C 39/024 |
| 2019/0308750 A1* | 10/2019 | Duval | B64D 1/02 |
| 2020/0047353 A1* | 2/2020 | Zheng | B64C 39/024 |

* cited by examiner

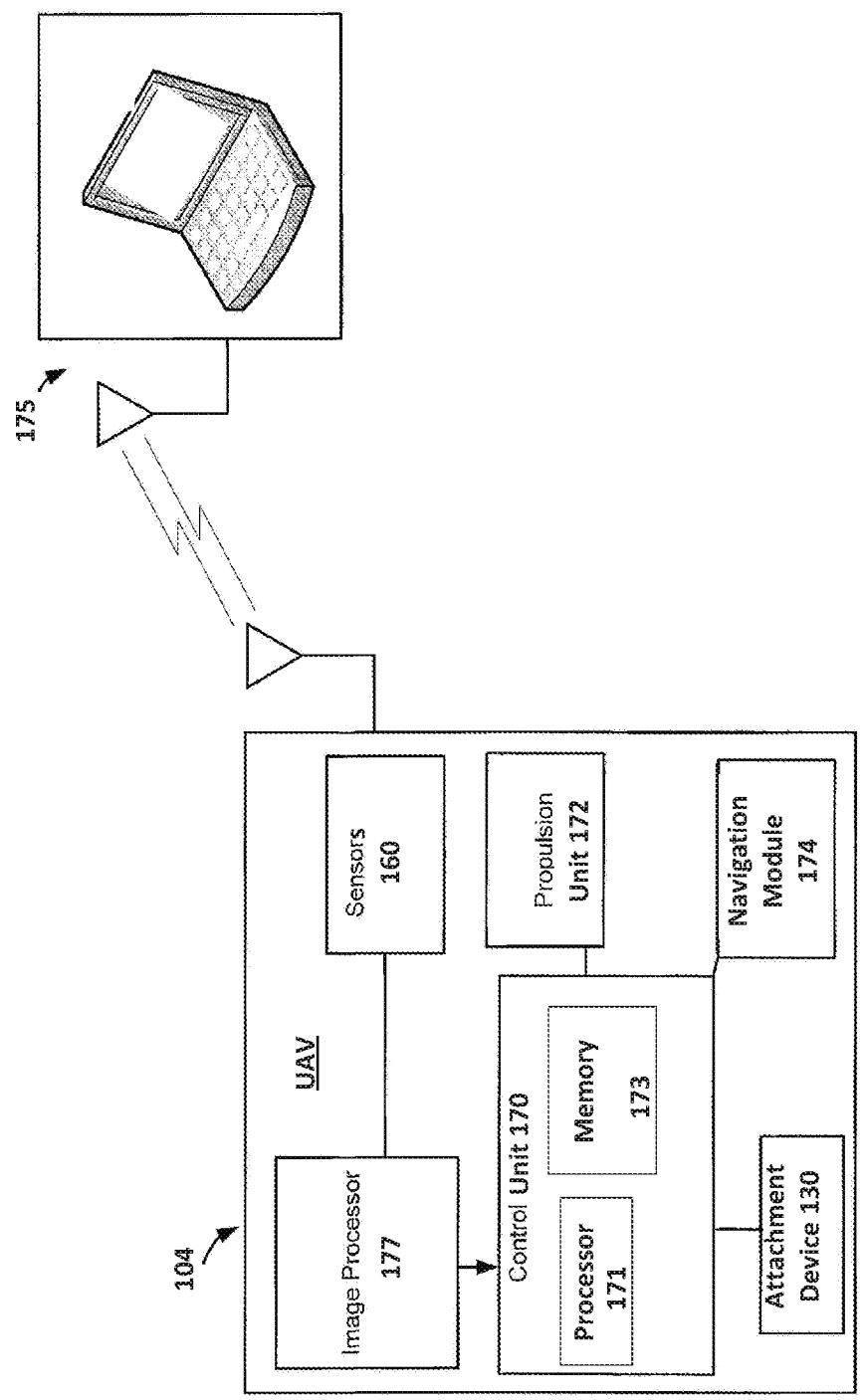

Receiving information from the at least one attachment device indicating whether the at least one attachment device is opened or closed — 226

Figure 10

Detecting, via at least one sensor, an angular position of the cargo relative to the underside of the UAV — 228

Figure 11

Calculating an angular position of the cargo relative to the UAV based on an angle of the cable — 230

UNMANNED AERIAL VEHICLE AND CARGO ATTACHMENT SYSTEM FOR THE UNMANNED AERIAL VEHICLE

FIELD

The present disclosure generally relates to systems and methods for transporting sling-loaded cargo, and more particularly to transporting sling-loaded cargo via an unmanned aerial vehicle (UAV).

BACKGROUND

It is often desirable to utilize aerial vehicles to transport cargo to various destinations. Such aerial vehicles, for example helicopters or other multi-rotor rotorcraft, connect an external load, such as cargo, to a sling that is attached to the aerial vehicle for lift and transport of the cargo. The sling comprises a line, such as a cable, that can vary in length, often up to 100 feet or more. The cargo can likewise vary in shape, size, and weight.

Currently, manual operation is required to attach and detach a sling cable to cargo for transport. A pilot of the aerial vehicle operates controls to position the aerial vehicle in a desired location with respect to the cargo, and a ground crew external to the aerial vehicle manipulates a load-engaging device to manually attach the cargo to the sling cable or to disengage the cargo from the sling cable.

With the increased use of unmanned aerial vehicles, a system and process to connect a sling line to a cargo and successfully transport the cargo during a flight operation without human assist is desired.

SUMMARY

In one example, a method for transporting sling-loaded cargo using an unmanned aerial vehicle (UAV) is described. The method comprises receiving instructions at the UAV to transport the cargo to a target location, coupling at least one electronically-controllable attachment device positioned below an underside of the UAV to a first portion of a sling cable, the sling cable having a predetermined length and a second portion of the sling cable being secured to the cargo, and operating at least four laterally-arranged rotors to cause the UAV to take-off and navigate to (i) a position within a predetermined area above the cargo and (ii) an initial operating height, the initial operating height being less than the predetermined length of the cable such that the UAV does not support the cargo. The method further comprises determining that the UAV is positioned within the predetermined area above the cargo, and responsive to determining that the UAV is positioned within the predetermined area, operating the at least four laterally-arranged rotors to elevate the UAV above the initial operating height to lift the cargo and controlling the UAV to navigate to the target location.

In another example, a transport system is provided. The transport system comprises a UAV having at least four laterally-arranged rotors, one or more sensors on the UAV configured to detect an angular position of cargo relative to an underside of the UAV, an attachment device affixed to the underside of the UAV and configured to releasably couple to a first portion of a cable having a predetermined length and being secured to the cargo at a second portion of the cable.

The system further comprises a control system for controlling transport of the cargo, comprising one or more processors configured to execute instructions stored in memory to perform functions of: opening a retaining latch on the attachment device to receive the first portion of the cable, closing the retaining latch to couple the first portion of the cable to the attachment device, operating the at least four laterally-arranged rotors to cause the UAV to elevate to an initial operating height, the initial operating height being less than the predetermined length of the cable such that that UAV does not support the cargo, determining, via the one or more sensors, that the UAV is positioned within a predetermined region above the cargo, and responsive to determining that the UAV is positioned within the predetermined region above the cargo, operating the at least four laterally-arranged rotors to elevate the UAV to a second height that is greater than the initial operating height and controlling the UAV to navigate to a target location.

In another example, a control system for controlling transport of a cargo is provided. The control system comprises one or more processors configured to execute instructions stored in memory to perform functions of coupling at least one electronically-controllable attachment device positioned below an underside of the UAV to a first portion of a sling cable, operating at least four laterally-arranged rotors to cause the UAV to elevate to an initial operating height, the initial operating height being less than a predetermined length of the sling cable such that the UAV does not support the cargo, determining that the rotorcraft is positioned within a predetermined area above the cargo, and responsive to determining that the UAV is positioned within a predetermined area above the cargo, operating at least four laterally-arranged rotors to cause the UAV to take-off and navigate to (i) a position within a predetermined area above the cargo and (ii) an initial operating height, the initial operating height being less than the predetermined length of the sling cable such that the UAV does not support the cargo.

In a further example, a cargo attachment system for a UAV having at least four laterally-arranged rotors is provided. The system comprises a support beam structure comprising a plurality of support beams, at least one of the plurality of support beams being affixed to an underside of the UAV, the support beam structure having a length projecting downwardly from the underside of the UAV that is less than a length of the landing gear structure, wherein at least one of the plurality of support beams projects away from the landing gear structure, and an attachment device coupled to at least one of the plurality of support beams, the attachment device being electrically controllable.

In another example, a UAV is provided. The UAV comprises a rotorcraft having at least four laterally-arranged rotors, a landing gear structure affixed to an underside of the UAV, a support beam structure comprising a plurality of support beams affixed to the underside of the UAV, the support beam structure having a length projecting downwardly from the underside of the UAV that is less than a length of the landing gear structure, wherein at least one of the plurality of support beams projects away from the landing gear structure, and an attachment device coupled to at least one of the plurality of support beams, the attachment device being electrically controllable.

In another example, a method of attaching a sling-loaded cargo to a UAV is provided. The method comprises electrically controlling a latch on an attachment device to open the latch, the attachment device being fixed to a support structure having a length projecting downwardly from an underside of the UAV that is less than a length of the landing gear structure, receiving a first portion of a cable at the attachment device, and electrically controlling the latch to close the latch to secure the first portion of the cable to the attachment device.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 5 illustrates a block diagram of an example of the system of FIG. 1A, according to an example implementation.

FIG. 10 illustrates another method for use with the method shown in FIG. 6, according to an example implementation.

FIG. 11 illustrates another method for use with the method of FIG. 6, according to an example implementation.

FIG. 12 illustrates another method for use with the method of FIG. 11, according to an example implementation.

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Examples, methods, and systems are described to attach a sling-loaded cargo to an aerial vehicle and to then transport and release the cargo. The system and methods described herein provide for electrical control of attachment and release of a cargo from an aerial vehicle. To this end, an attachment mechanism which is in electrical communication with a control unit associated with the aerial vehicle is controlled to open and close, effectively releasing or retaining a sling cable therein, the cable also being secured to a cargo. The system and methods provide for a more streamlined transport process and do not require time and physical efforts of personnel for positioning, attachment, and/or release of the cargo from the aerial vehicle. The systems and methods provide an improved process for attaching a sling-loaded cargo to an aerial vehicle and for autonomously controlling the aerial vehicle to take-off and then lift the cargo. Additionally, the capability for remote control allows for improved decisions to be made with respect to landing of cargo and/or a UAV transporting cargo in contingent scenarios, wherein for a variety of reasons a change from a predetermined flight trajectory may occur.

Figure 1A:
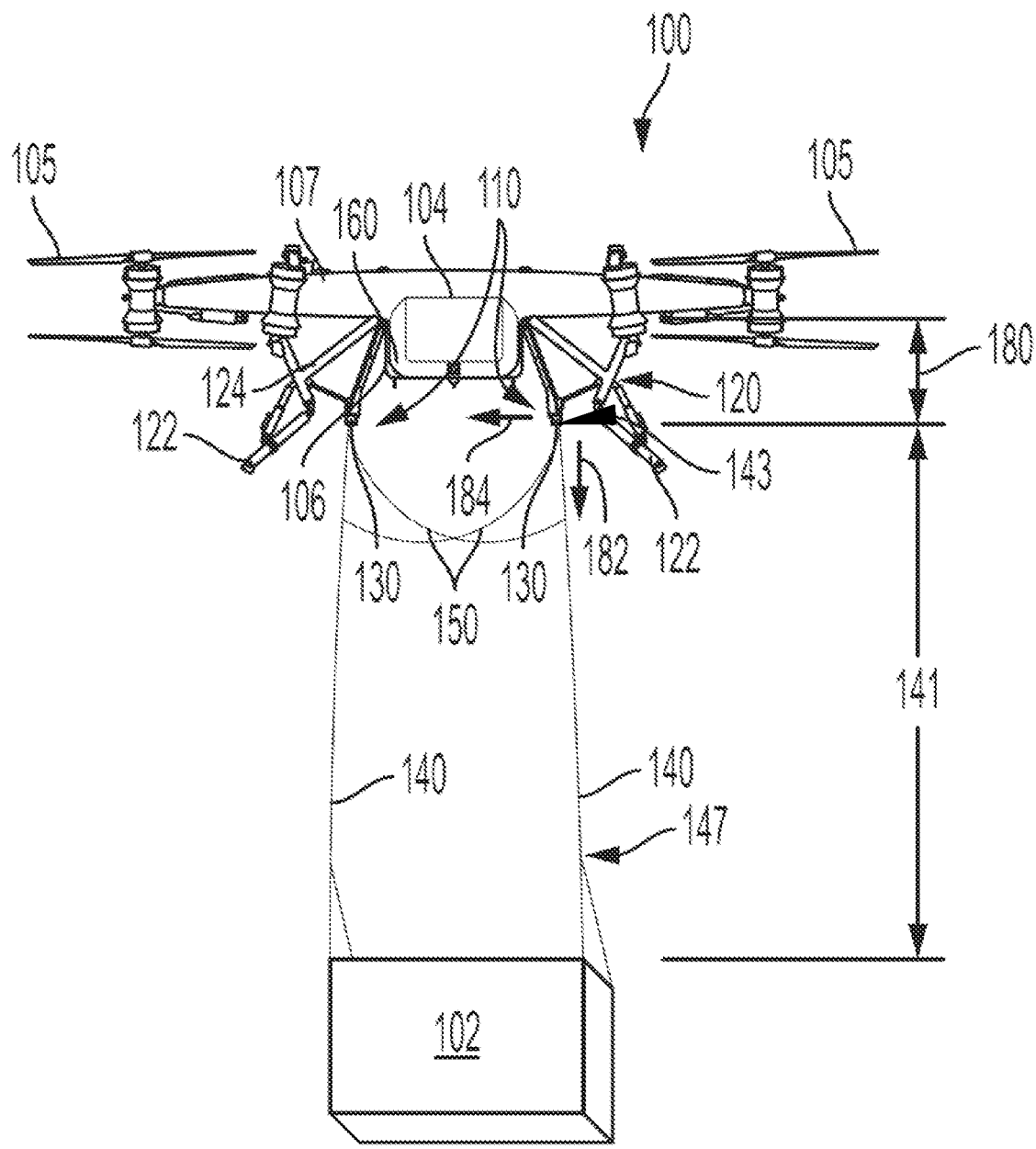
FIG. 1A illustrates a transport system for transporting cargo, according to an example implementation.

Referring to FIG. 1A, a transport system 100 to transport cargo 102 is illustrated, according to an example implementation.

The transport system 100 includes an unmanned aerial vehicle (UAV) 104 comprising a support beam structure 110, a landing gear structure 120, at least one electrically controllable attachment device 130, and two cables 140. In operation, the UAV 104 is utilized to lift and transport cargo.

Figure 1B:
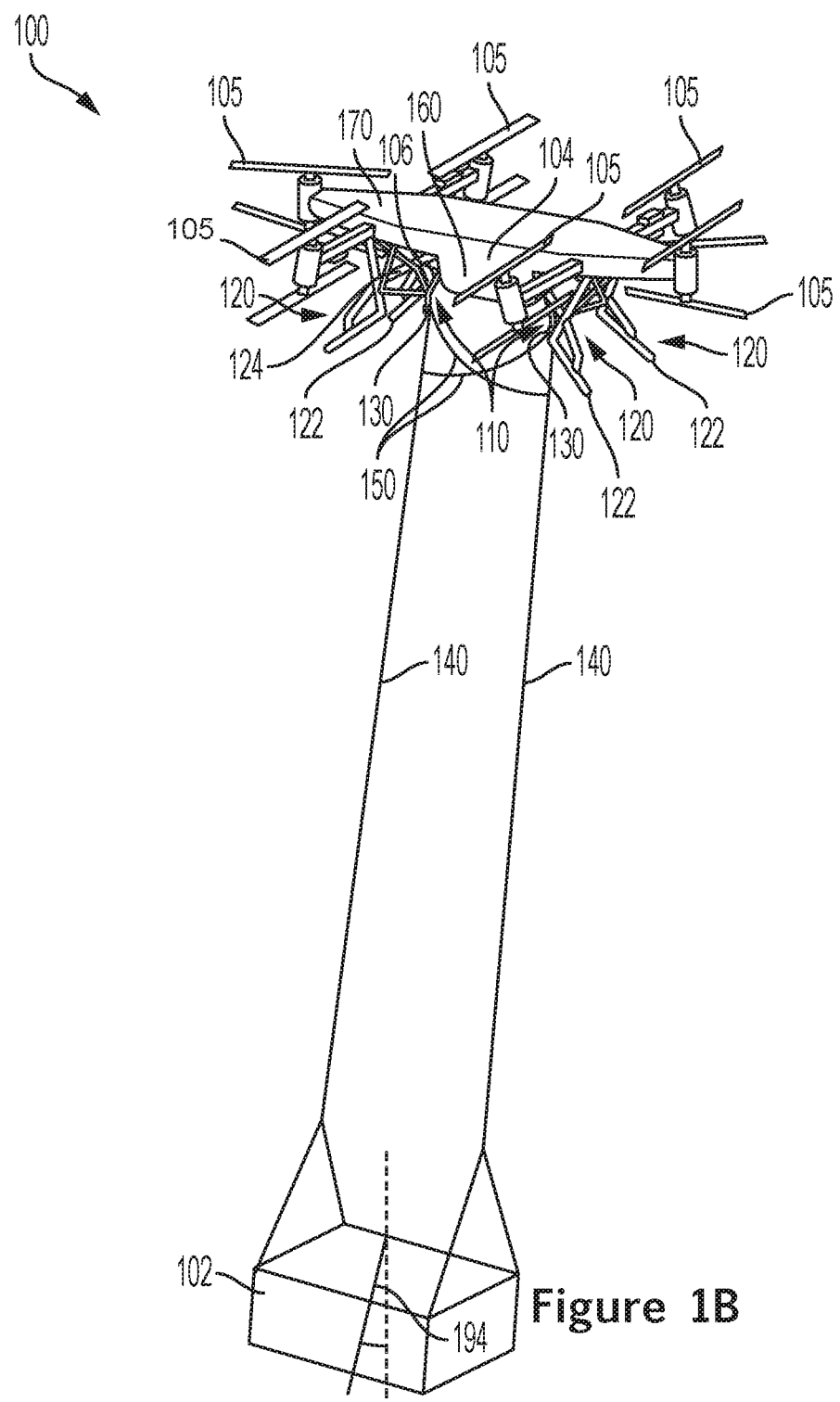
FIG. 1B illustrates a perspective view of the transport system of FIG. 1A, according to an example implementation.

The UAV 104 includes a main housing 107 and a propulsion unit mounted on the main housing 107 for propelling through an environment. The propulsion unit may be an internal combustion engine, an electric battery, or a hybrid engine such as an electric-internal combustion engine. The UAV 104 further comprises one or more rotor systems coupled to the housing and operatively connected to the propulsion unit. In one example embodiment, a rotor system comprising one or more propeller blades is attached to the main housing 107 via an arm extending from the housing. Within examples, the UAV 104 includes at least four laterally-arranged rotors. The laterally-arranged rotors may be rotor assemblies that are operatively supported by and spaced around the main housing 107 of the UAV. In some example embodiments, the UAV 104 comprises four laterally-arranged rotors 105. FIG. 1A shows two of four such rotors in an aft view of the UAV 104. FIG. 1B illustrates a perspective view of the transport system of FIG. 1A, and shows all of the rotors 105 of UAV 104. In other examples, more or fewer rotors may be present. The support beam structure 110 and the landing gear structure 120 are both shown to be connected to an underside 106 of the main housing 107 of the UAV 104.

FIG. 1B also shows an angle 194, formed between an axis of rotation and a reference point on cargo 102. As the cargo 102 sways or moves during a flight, the angle 194 will vary.

In one example, the UAV 104 is designed to carry cargo of up to about 250 lbs. In other examples, the UAV 104 is designed to carry cargo of greater weight, such as 300 lbs. Other examples are possible as well.

The landing gear structure 120 enables the UAV 104 to take off and land on ground, and comprises a plurality of legs 122, each of which are connected to the underside 106 of the UAV 104 and extend downward from the underside 106, toward the ground; each of the legs 122 may have a ground engaging mechanism, such as wheels, at a lower end of the leg 122. Additional supports 124 may affix the legs 122 to the UAV 104.

The support beam structure 110, like the landing gear structure, is affixed to the underside 106 of the UAV and extend downward and away from the underside 106, toward the ground. In some embodiments, the support beam structure 110 attaches directly to a surface on the underside 106 of the UAV. In other embodiments, the support beam structure 110 may attach to the landing gear structure 120 or another intermediary structure that is in turn attached to the UAV 104.

The at least one electronically-controllable attachment device 130 is positioned below the underside 106 of the UAV 104. The example of FIG. 1A includes two electronically-controllable attachment devices 130. The electronically-controllable attachment devices 130 are connected to the support beam structure 110 and serve to each releasably couple a cable 140 to the support beam structure 110. The electronically-controllable attachment devices 130 are configured to operate when the UAV 104 is on the ground. An example electronically-controllable attachment device 130 is described with reference to FIG. 3.

The cables 140 may comprise sling cables or payload suspension cables. In one example embodiment, the length of each of the cables 140 is at least 25 feet. In some example embodiments, the length of each of the cables 140 is in the range of 25 to 150 feet, the diameter of each of the cables 140 is about 0.172 inches, and the cables 140 each have a minimum spliced strength of 3,780 lbs. In some embodiments, each of the cables 140 has a maximum working load of 840 lbs.

The UAV 104 is configured to lift and transport cargo via the cables 140. Each cable 140 is connected to the support beam structure 110 by way of a first anchor point of the cable 140 being coupled to a respective attachment device 130. The cable 140 has a second anchor point that is coupled to the cargo 102. During transit, cargo can become unstable and swing in any given direction. In some cases, cargo can swing high enough to become entangled in the landing gear structure, rotorcraft airframe, and/or rotors. Thus additionally, as shown in FIG. 1A, lateral arresting cable portions 150 may be provided. The lateral arresting cable portions 150 extend between a first cable 140 and a second cable 140 to prevent interference of the cables 140 with the landing gear structure 120, or other parts of the UAV 104 that may protrude into either the first cable 140 or the second cable's 140 unrestricted range of motion.

The lateral arresting cable portions 150 extend between the cables 140, from a first point of attachment on one cable (located near the attachment device 130) to a second point of attachment on another cable. The second point of attachment is located below the landing gear structure 120 to limit movement of the sling-loaded cargo 102 operating envelope to prevent interference with the landing gear structure 120. In one example embodiment, the second point of attachment is positioned about 2 feet below the landing gear structure 120. In another example embodiment, the second point of attachment is positioned about 5 feet below the landing gear structure 120. Further example distances may be envisioned.

In some embodiments, the attachment device 130 is attached to at least one of the plurality of support beams 111, 112, 113, 114 at a position such that one of the cables 140 coupled to the attachment device 130 is capable of reaching a maximum threshold angle without interfering with the landing gear 120 to which the support beam structure 110 is attached. For instance, the cables 140 may be limited to an operating envelope in which the cables 140 are prevented from interfering with the landing gear structure 120. In example embodiments, the position of the attachment device 130 and the points of attachments of the lateral arresting cable portions 150 are selected such that the cables 140 are limited to an operating envelope in which the cables 140 are prevented from interfering with the landing gear structure 120.

One or more sensors 160 may be attached to the UAV 104 and may be positioned to observe the region in which the cargo is being lifted and transported. The sensors 160 may include sensors useful for identifying objects and aiding in navigation, such as optical sensors (e.g., camera, infrared, RGB camera), acoustic sensors, radar sensors, and a multifunction light detection and ranging (LIDAR) system. Optical sensors may capture images nominally at a set frame capture rate. The sensors 160 may further include a rotary variable inductance transducer (RVIT) to detect an angular position of the cargo 102 relative to the underside 106 of the UAV 104.

Examples of computational resources on the UAV 104 may include, but are not limited to, built-in control systems for receiving and storing information and executing instructions to control the attachment device 130, guidance systems to perform low-level human pilot duties such as speed and flight-path stabilization, and scripted navigation functions. The UAV 104 may also include a communication interface for receiving instructions from a remote control system.

Figure 16A:
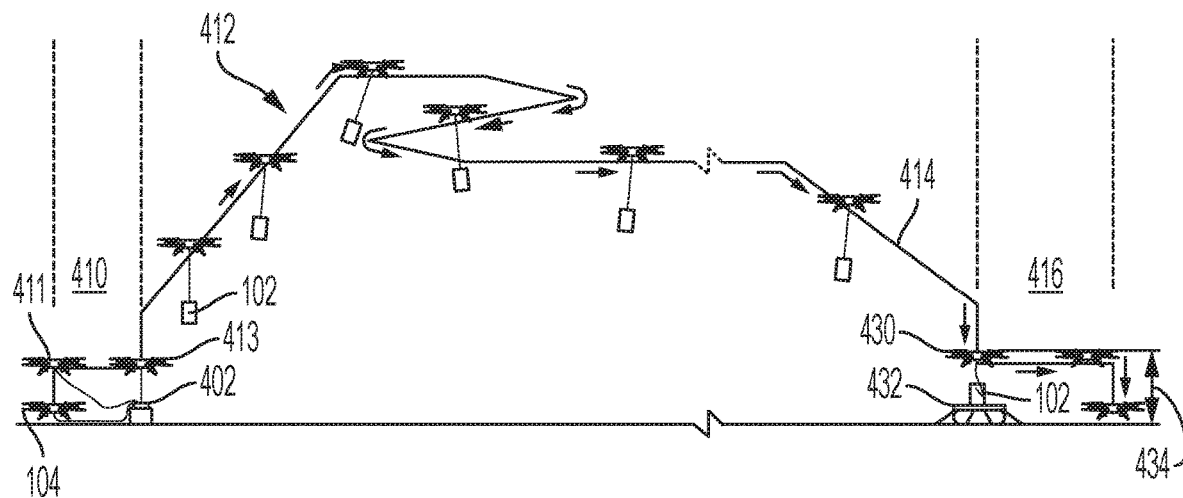
FIG. 16A illustrates a mission operation for attaching and transporting cargo of the system of FIG. 1A, according to an example implementation.

In some examples, the UAV 104 is configured to navigate to a target location, such as the target location 416 shown in FIG. 16A, to make a determination that the UAV 104 is hovering above the target location, and then to actuate its release mechanism on the attachment device 130 to open a pathway to the opening 132 to release the cable 140 holding the cargo 102 from its connection to the UAV 104.

Figure 2:
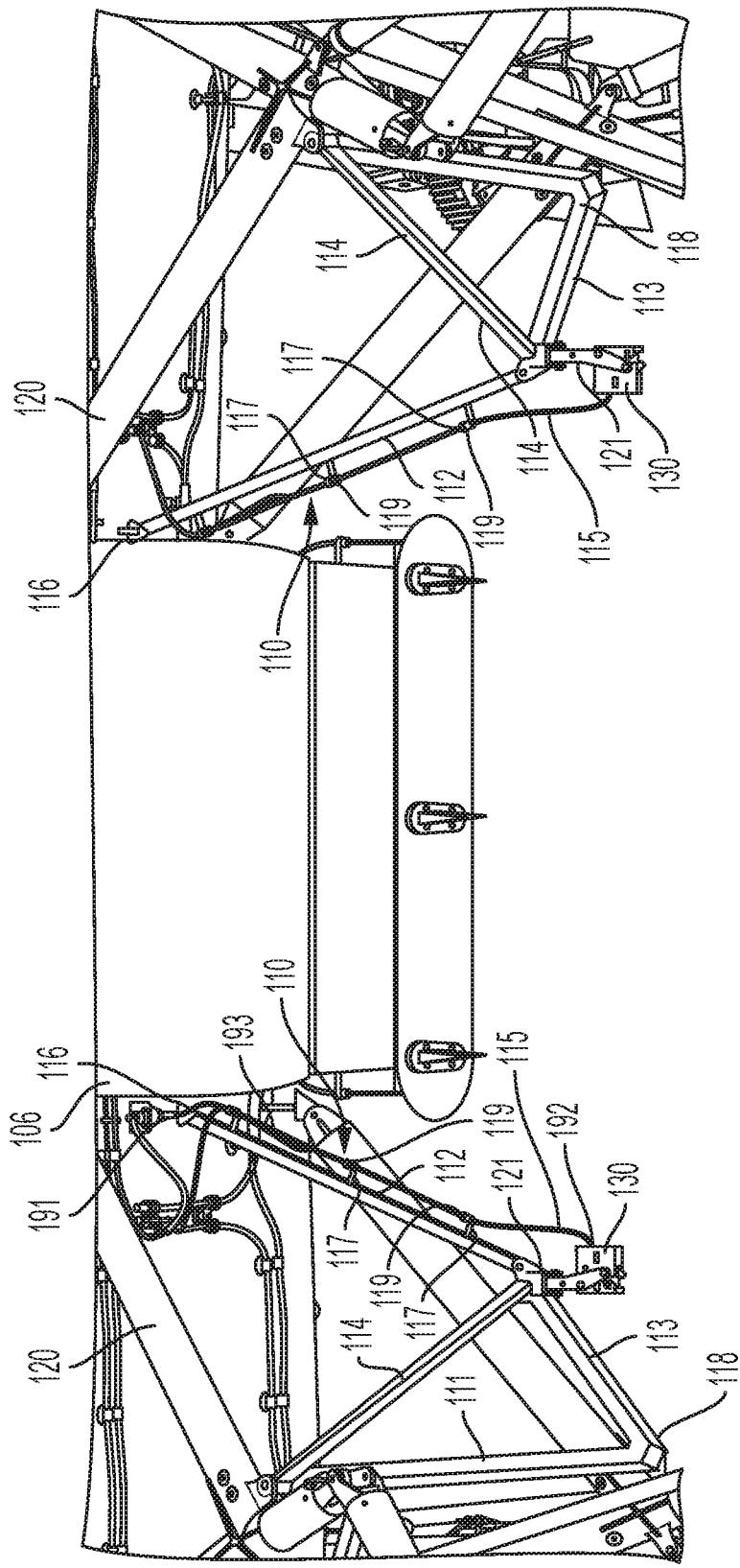
FIG. 2 illustrates an enlarged view of the attachment structure for the system of FIG. 1A, according to an example implementation.

FIG. 2 illustrates an enlarged view of two support beam structures 110 for the transport system 100 of FIG. 1A, according to an example implementation. As shown in FIG. 2, an aft view looking up towards the underside 106, each support beam structure 110 comprises a plurality of support beams, including a first or an upper support beam 112, a second or a lower support beam 114, an air vehicle lug attachment 116, a landing gear lug attachment 118, and a link assembly 121. The air vehicle lug attachment 116 is affixed to a surface on the underside 106 of the UAV 104. The upper support beam 112 is connected to the lug attachment 116, and may comprise an alignment feature 117 defining a lumen 119, through which an electric wire 115 extends. The electric wire 115 has a first end 191 and a second end 192 and an intermediate portion 193 between the first end 191 and the second end 192; the intermediate portion 193 extending through the lumen 119 of the alignment feature 117, and the second end 192 of the electric wire 115 connects to the attachment device 130. The electric wire 115 serves to electrically couple the attachment device 130 to a controller on the UAV 104.

The lower support beam 114 serves to further secure the upper support beam 112 and the attachment device 130 to the UAV 104. To that end, a first end of the lower support beam 114 is connected to the upper support beam 112 and a second end of the lower support beam 114 is connected to the UAV 104 or to a structure affixed to the UAV 104. Multiple lower support beams 114 may be present to aid in securing the support beam structure 110; FIG. 2, for example, shows three lower support beams 111, 113, 114 for each support beam structure 110. The landing gear lug attachments 118 affix the second end of each of the lower support beams 114 to the landing gear structure 120 in FIG. 2. Both the lower support beams 114 and the upper support beams 112 may be formed from a high strength material, for example, from a metal such as steel, aluminum, or from a combination of metal and composite materials. Other high strength materials may also be contemplated.

The link assembly 121 secures the attachment device 130 to the support beam structure 110. The support beam structure 110 has an overall length 180 that is less than a length of a landing gear structure 120 of the UAV 104, the support beam structure projecting downwardly in direction 182 from the underside 106 of the UAV 104 and away in direction 184 from the landing gear structure 120. The overall length 180 is such that the support beam structure 110 does not extend below the landing gear structure 120 during flight of the UAV 104. One or more of the plurality of support beams of the support beam structure 110 project away from the landing gear structure 120 (e.g., in the direction 184 away from the landing gear structure). For instance, as shown in FIG. 2, lower support beams 113 and 114 project away from the landing gear structure 120. This projection away from the landing gear structure 120 helps to provide an operating envelope for the cable 140 such that the cable 140 does not interfere with the landing gear structure 120 during transport of the cargo 102.

Figure 3:
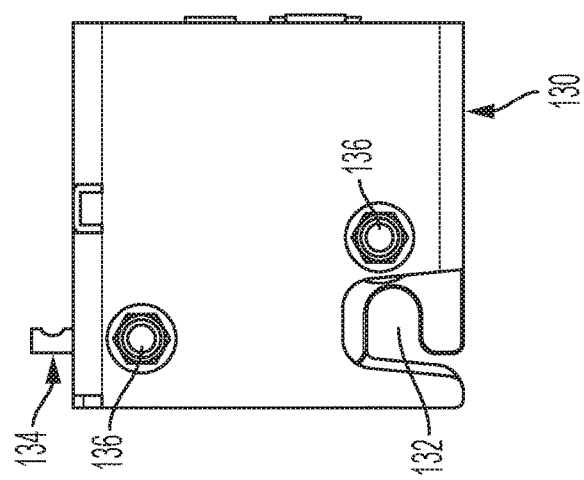
FIG. 3 illustrates an example attachment device for use with the system of FIG. 1A, according to an example implementation.

FIG. 3 illustrates an example attachment device 130 for use with the system of FIG. 1A, according to an example implementation. In FIG. 3, the attachment device 130 comprises a latch which is electrically controllable to open and close, thus controlling access to an opening 132 through which a cable or component affixed to a cable can be inserted.

The attachment device 130 may be formed from a high strength metal, such as stainless steel, and may include a cam and spring. The cam may be electrically actuated and comprise discrete position sensing capabilities, for example having the capability to detect whether the latch is an open state or closed state. In some example embodiments, the latch in its closed position may be able to retain and hold a tensile load of up to about 1100 lbs. The latch may be released, opened, or otherwise retracted to allow access into the opening 132, or the latch may be closed to shut off such access. A mechanical override trigger 134 may additionally be provided on the attachment device 130, which can be manipulated to manually move the latch, thereby opening or closing access to the opening 132. An actuated hook or solenoid-pin and clevis device may be used in an alternative embodiment to serve the retention and release functions discussed herein. Further, any other form of manipulatable release mechanism may be envisioned. Bolts 136 serve to affix a link assembly, such as the link assembly 121 of FIG. 2, to the attachment device 130.

The electrical actuation of the latch on the attachment device 130 may be remotely controlled. Instructions to open or close the latch may thus be provided by a control unit on the UAV 104, such as the control unit 170, or by a remote control system, such as the remote control system 175 discussed with reference to FIG. 5. In this manner, instructions may be sent to open the latch on the attachment device 130, thereby releasing a cargo from a UAV during a mission profile or a contingency action. The attachment device 130 may further be configured to send signals to the control unit 170 or a remote control system such as remote control system 175 indicating whether the attachment device is opened or closed. Alternatively, an operator may manually command release of the sling-loaded cargo. A fault may be asserted by the control unit 170 or remote control system should a command be sent to open or close the attachment device and thereafter the control unit does not receive an indication that the status of the attachment device has been changed accordingly. Additionally, a release signal (whether manually by an operator or as a function performed by a processor) may be required to issue constantly for a predetermined period of time before the control unit executes instructions to electrically activate the release. The control unit may then hold an "open" command for a predefined time period before issuing a "rest" or "closed" command (wherein the latch closes). Example flight scenarios are described with reference to FIGS. 16A-D.

Figure 4A:
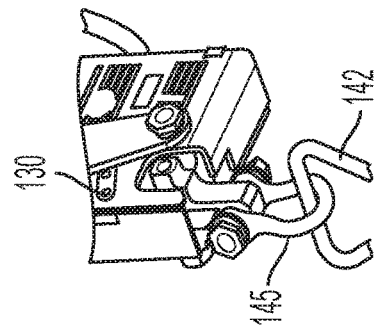
FIG. 4A illustrates an example attachment system to attach a cable to the attachment device of FIG. 3, according to an example implementation.

FIG. 4A illustrates an example attachment system to attach a cable 140 to the attachment device 130 of FIG. 3, according to an example implementation. In FIG. 4A, a cable attachment 142 at an end of the cable 140 serves as a first anchor point for the cable 140. The cable attachment 142 routes or extends through a hole in a latch striker 144, and the T-shaped connector in turn is positioned within the opening 132. In alternative embodiments, the shape of the cable attachment 142 may vary, as may the shape of the latch striker 144. The latch striker 144 ensures repeatable and consistent release operation for when the latch actuates, serving to eject the striker in a latch open state. The latch striker 144 also serves to protect the cable 140 from wear or damage by isolating the cable 140 from the latch itself. In FIG. 4A, the latch striker 144 and the cable attachment 142 are integral, forming part of an assembly. The latch striker 144 may comprise titanium, steel, or aluminum, in example embodiments. Other materials may be contemplated as well.

Figure 4B:
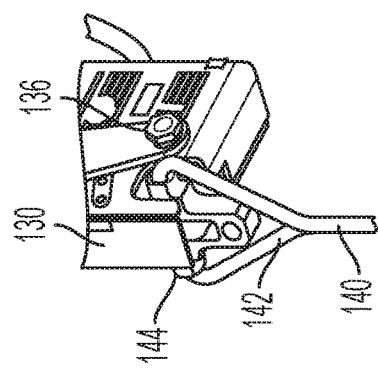
FIG. 4B illustrates an example attachment system to attach a cable to the attachment device of FIG. 3, according to an example implementation.

FIG. 4B illustrates an example attachment system to attach a cable 140 to the attachment device 130 of FIG. 3, according to an example implementation. In FIG. 4B, an additional attachment component is provided; namely, a loop connector 145, which connects to the latch striker 144 via a bolt or other rod-shaped fastener that extends through a hole in the latch striker 144. The cable attachment 142 is then coupled to the loop connector 145 by being positioned through a lumen of the loop connector 145.

Figure 4C:
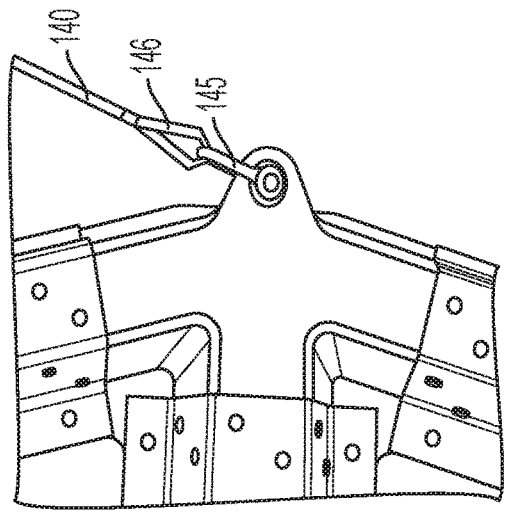
FIG. 4C illustrates an example attachment system to attach a cable to cargo for use with the system of FIG. 1A, according to an example implementation.

FIG. 4C illustrates an example attachment system to attach a cable 140 to cargo 102 for use with the system of FIG. 1A, according to an example implementation. The attachment system shown in FIG. 4C is similar to that of FIG. 4B, wherein a second cable attachment 146 of the cable 140 serves as a second anchor point for the cable 140, the second cable attachment 146 then being coupled to a loop connector 145 by extending through a hole of the loop connector 145. The loop connector 145 may be coupled to the cargo via a bolt or other rod that extends through a hole in the cargo structure.

FIG. 5 illustrates a block diagram of an example of the transport system 100 of FIG. 1A, according to an example implementation.

The UAV 104 includes a control unit 170, which is operatively coupled to a propulsion unit 172, a navigation module 174, the attachment device 130, the one or more sensors 160, and an image processor 177. A remote control system 175 may communicate with the control unit 170 of the UAV 104.

The control unit 170 controls operation of the UAV 104. As used herein, the term "control unit" may include any processor-based or microprocessor-based system including systems using microcontrollers, logic circuits, and any other circuit or processor including hardware, software, or a combination thereof capable of executing the functions described herein. For example, each of the control unit 170 may be or include one or more processors 171 that are configured to control operation of the UAV 104.

The control unit 170, for example, is configured to execute a set of instructions that are stored in one or more storage elements, or memory, 173 in order to process data. The memory 173 may be in the form of an information source or a physical memory element. The set of instructions may include various commands that instruct the control unit 170 to perform specific operations such as the methods and processes of the various examples of the subject matter described herein. The set of instructions may be in the form of a software program. Software may be stored on a tangible and non-transitory computer readable storage medium, such as a computer hard drive, ROM, RAM, or the like.

Thus, as described with reference to FIGS. 1-5, a system for attaching and facilitating transport of sling-loaded cargo is achieved. In some implementations, electrical control of attachment and release of a cable (that is attached to cargo) from a UAV is achieved, which provides for a more streamlined transport process and does not require time and physical efforts of personnel. Additionally, remote control allows for improved decisions to be made with respect to landing of cargo and/or a UAV transporting cargo in contingent scenarios, wherein for a variety of reasons a change from a predetermined flight trajectory occurs.

Figure 6:
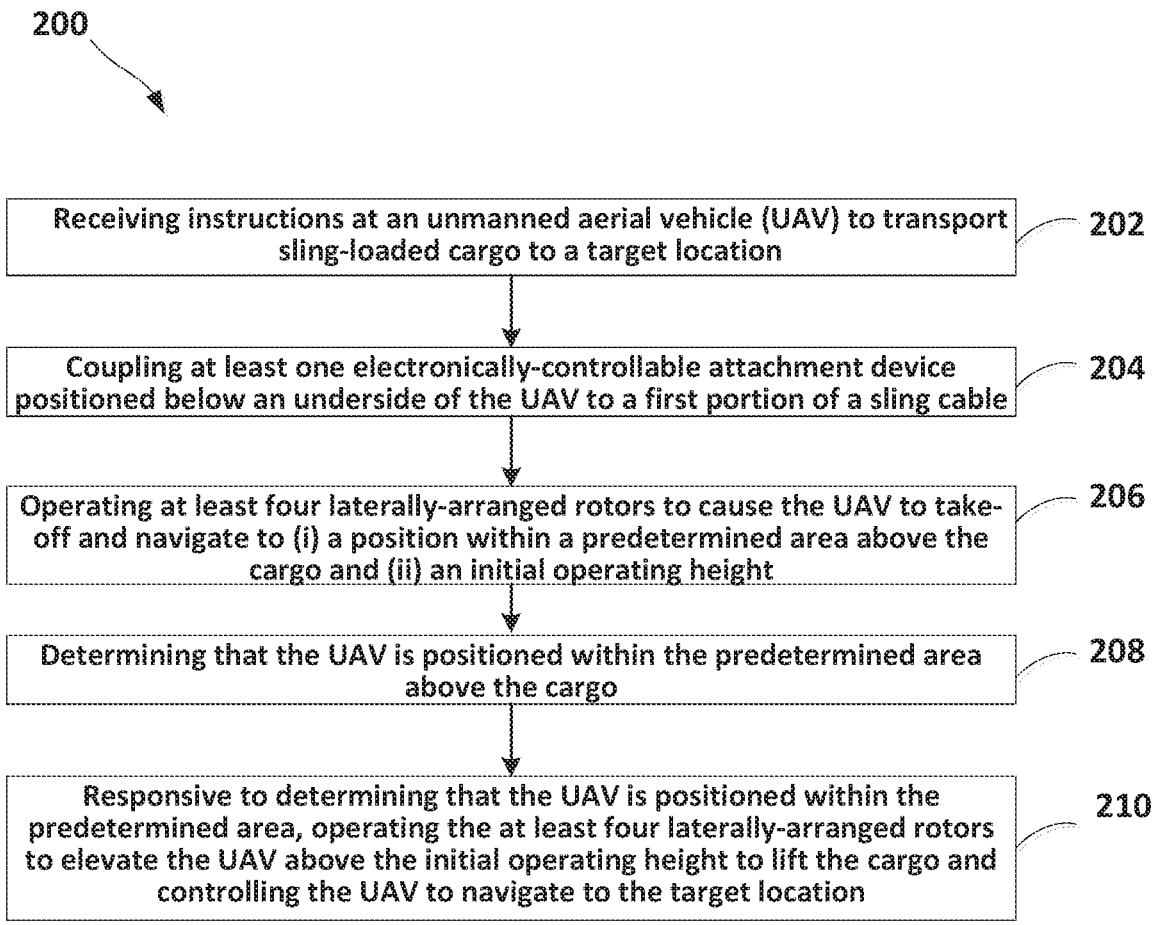
FIG. 6 illustrates a flowchart of an example of a method for transporting sling-loaded cargo using a UAV, such as the UAV of the system of FIG. 1A, according to an example implementation.

FIG. 6 shows a flowchart of an example of a method 200 for transporting sling-loaded cargo using a UAV. Method 200 shown in FIG. 6 presents an example of a method that, for example, could be used with the transport system 100 shown in FIGS. 1A-B, for example. Method 200 includes one or more operations, functions, or actions as illustrated by one or more of blocks 202-210. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes receiving instructions at a UAV 104 to transport sling-loaded cargo 102 to a target location. Sling-loaded means that the cargo 102 is attached to the UAV 104 via a sling cable. In some embodiments, the UAV 104 may receive the instructions from a remote control system such as the remote control system 175 of FIG. 5. The UAV 104 may be docked at a storage location or otherwise grounded on land, and upon receiving the instructions, the UAV 104 launches into the air and flies toward a region containing the cargo 102.

At block 204, the method 200 includes coupling at least one electronically-controllable attachment device positioned below an underside of the UAV 104 to a first portion 143 of a sling cable 140. The electrically-controllable attachment device may be the attachment device 130 described with reference to FIGS. 1A-4B, and may be coupled to the first portion 143 of the sling cable 140 as described with reference to FIGS. 4A-B, for example.

The sling cable 140 has a predetermined length 141, and a second portion 147 of the sling cable 140 is secured to the cargo 102 at a first anchor point of the cargo 102. The second portion 147 of the sling cable 140 may comprise an attachment component at a second anchor point, such as the cable attachment 142 of FIG. 4C, which may be coupled to the cargo 102 as described with reference to FIG. 4C.

At block 206, the method 200 includes operating at least four laterally-arranged rotors to cause the UAV 104 to take-off and navigate to (i) a position within a predetermined area above the cargo, and (ii) an initial operating height 413, as shown in FIGS. 16A-D. The initial operating height 413 is less than the predetermined length of the cable such that the UAV 104 does not support the cargo 102.

At block 208, the method 200 includes determining that the UAV 104 is positioned within the predetermined area above the cargo 102. The UAV 104 may initially be positioned adjacent the cargo on land during attachment of the cargo 102 to the UAV 104, and at least four laterally-arranged rotors may be operated to elevate the UAV 104 initially vertically in an upward direction followed by flying the UAV 104 in a horizontal or angled direction toward the predetermined area. The predetermined area may be located directly above the cargo such that the UAV 104 hovers directly above the cargo at the initial operating height.

At block 210, the method 200 includes responsive to determining that the UAV 104 is positioned within the predetermined area, operating the at least four laterally-arranged rotors to elevate the UAV 104 above the initial operating height to lift the cargo 102 and controlling the UAV 104 to navigate to the target location.

Figure 7:
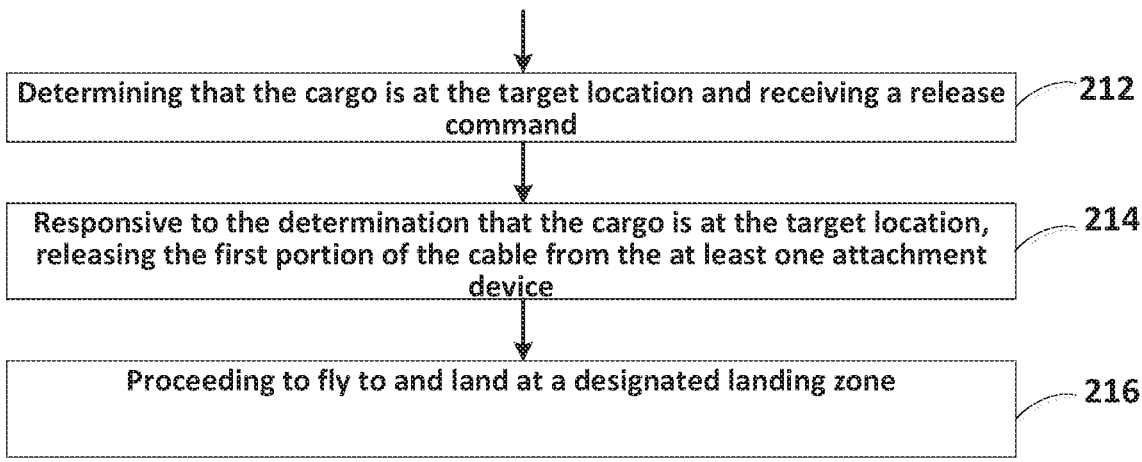
FIG. 7 illustrates another method for use with the method shown in FIG. 6, according to an example implementation.

FIG. 7 shows another method for use with the method 200 shown in FIG. 6, according to an example implementation. In FIG. 7, at block 212, the method includes determining that the cargo 102 is at the target location. At block 214, the method includes responsive to the determination that the cargo 102 is at the target location, releasing the first portion 143 of the cable 140 from the at least one attachment device 130. The first portion 143 of the cable 140 may be released from an attachment device, such as the attachment device 130 described with reference to FIGS. 3-4B, for example. At block 216, the method includes proceeding to fly to and land at a target location.

Releasing the first portion 143 of the cable 140 may comprise receiving a release command, either manually by an operator, or as a function performed by the control unit 170 or a remote control system. A release command may issue constantly, for a predefined period of time, before the system electrically activates the latches on the attachment devices 130 to open. In one example embodiment, the predefined period of time comprises five seconds. In other example embodiments, the predefined period of time may comprise an amount of time that is less or more than five seconds.

Figure 8:
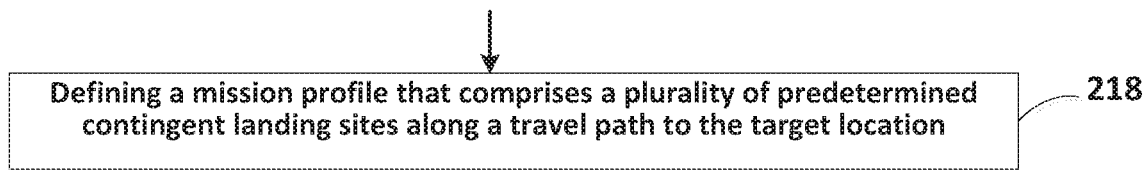
FIG. 8 illustrates another method for use with the method shown in FIG. 6, according to an example implementation.

FIG. 8 shows another method for use with the method 200 shown in FIG. 6, according to an example implementation. In FIG. 8, at block 218, the method includes defining a mission profile that comprises a plurality of predetermined contingency landing sites along a travel path to the target location. The predetermined contingent landing sites may each comprise a cargo recovery system. In the example embodiments shown in FIGS. 16C-16D, a plurality of contingent landing sites 440 are shown.

Figure 9:
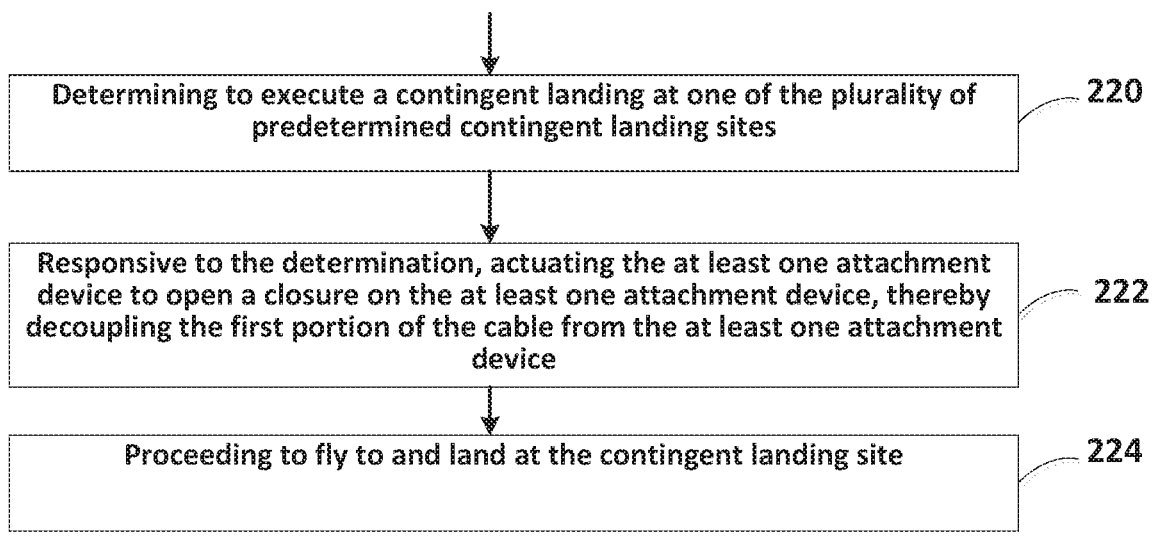
FIG. 9 illustrates another method for use with the method shown in FIG. 8, according to an example implementation.

FIG. 9 shows another method for use with the method 200 shown in FIG. 6, according to an example implementation. In FIG. 9, at block 220, the method includes determining to execute a contingent landing at one of the plurality of predetermined contingent landing sites. At block 222, the method includes responsive to the determination, actuating the at least one attachment device to open a closure on the at least one attachment device, thereby decoupling the first portion 143 of the cable 140 from the at least one attachment device. The closure may comprise a latch, in one example embodiment as described with reference to FIG. 3, and decoupling the first portion 143 of the cable 140 may operate as described with reference to FIGS. 4A-B. At block 224, the method includes proceeding to fly to and land at the contingent landing site.

FIG. 10 shows another method for use with the method 200 shown in FIG. 6, according to an example implementation. In FIG. 10, at block 226, the method includes receiving information from the at least one attachment device indicating whether the at least one attachment device 130 is opened or closed. The at least one attachment device may be configured to send signals indicating an opened or closed state for the attachment device 130. Such signals may be received at the control unit 170 of the UAV 104 or at a remote system, such as the remote control system 175 of FIG. 5.

FIG. 11 shows another method for use with the method 200 shown in FIG. 6, according to an example implementation. In FIG. 11, at block 228, the method includes detecting, via at least one sensor, an angular position of the cargo relative to the underside of the UAV.

FIG. 12 shows another method for use with the method 200 shown in FIG. 6, according to an example implementation. In FIG. 12, at block 230, the method includes calculating an angular position of the cargo relative to the UAV based on an angle of the cable. The calculation may comprise determining a reference point on the cargo 102, which can then be used to describe the angular motion of the cargo 102. The angular position of the reference point is the angle θ, shown as angle 194 in FIG. 1B, formed between an axis of rotation and the reference point. In some examples, angular displacement of the cargo may be calculated and described using rotation matrices or Euler angles.

Figure 13:
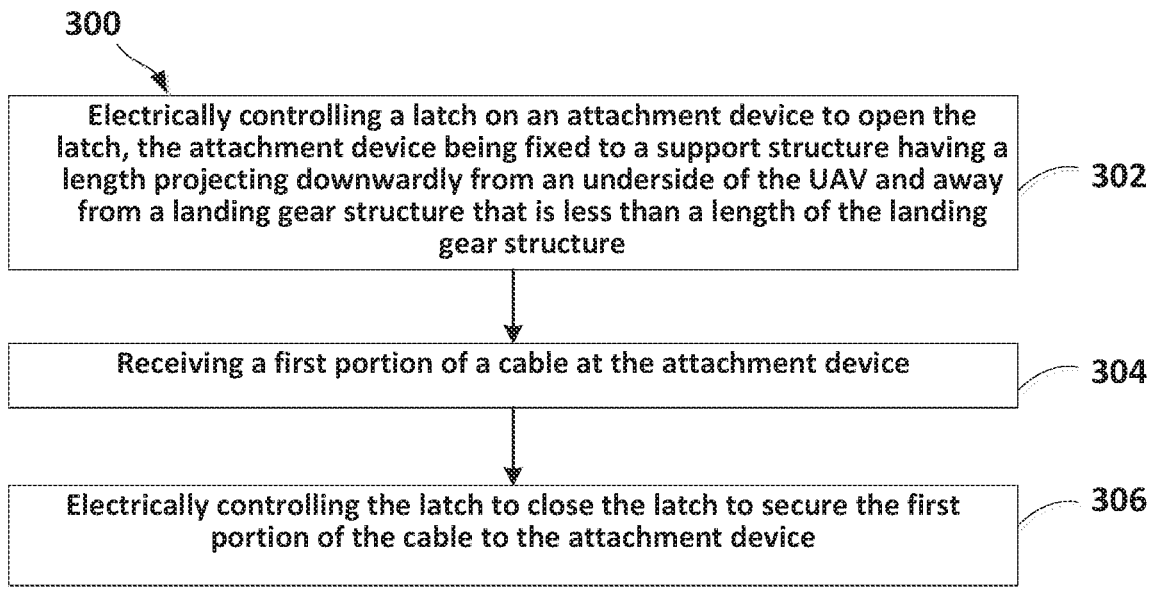
FIG. 13 illustrates a flowchart of an example of a method for attaching a sling-loaded cargo to a UAV, such as the UAV of the system of FIG. 1A, according to an example implementation.

FIG. 13 shows a flowchart of an example of a method 300 for attaching a sling-loaded cargo to a UAV, such as the UAV of the system of FIG. 1A, according to an example implementation. In FIG. 13, at block 302, the method includes electrically controlling a latch on an attachment device 130 to open the latch, the attachment device being fixed to a support structure having a length projecting downwardly and outwardly from an underside of the UAV that is less than a length of the landing gear. In some embodiments, the latch and attachment device comprise the latch and attachment device 130 described with reference to FIG. 3.

At block 304, the method includes receiving a first portion 143 of a cable 140 at the attachment device 130. In some embodiments, the first portion 143 of the cable 140 is received at the attachment device 130 as described with reference to FIGS. 4A-B.

At block 306, the method includes electrically controlling the latch to close the latch to secure the first portion 143 of the cable 140 to the attachment device. A control unit, such as the control unit 170 or the remote control system 175 of FIG. 5, may execute instructions to the UAV 104 to electrically control the latch to transition the latch to a closed position.

Figure 14:
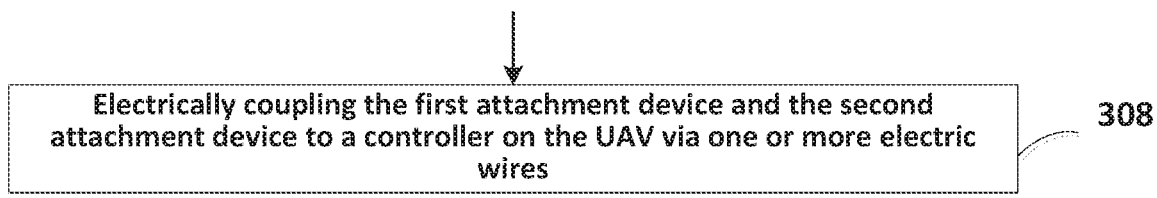
FIG. 14 illustrates another method for use with the method of FIG. 13, according to an example implementation.

FIG. 14 shows another method for use with the method 300 shown in FIG. 13, according to an example implementation. In FIG. 14 at block 308, the method includes electrically coupling the first attachment device and the second attachment device to a controller on the UAV via one or more electric wires.

Figure 15:
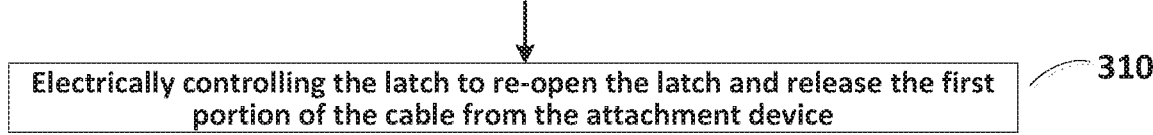
FIG. 15 illustrates another method for use with the method of FIG. 13, according to an example implementation.

FIG. 15 shows another method for use with the method 300 shown in FIG. 13, according to an example implementation. In FIG. 15 at block 310, the method includes electrically controlling the latch to re-open the latch and release the first portion 143 of the cable 140 from the attachment device 130.

FIG. 16A illustrates a mission operation for attaching and transporting cargo of the system of FIG. 1A, according to an example implementation. As shown in FIG. 16A, at a location 410, a UAV, such as the UAV 104 of FIG. 1A, is positioned on the ground and is coupled to a cargo, such as the cargo 102 of FIG. 1A. The cargo 102 is shown to be positioned within a takeoff stability device 402 that is on the ground in the example of FIG. 16A, and the cargo 102 is coupled to the UAV 104 via a cable, such as the cable 140 of FIG. 1A. A control module, such as the control unit 170 or the remote control system 175 of FIG. 5, may receive a predetermined flight trajectory based on a set of flight plan parameters. In response, the control unit 170 operates the rotors of the UAV 104 to move the UAV 104 along the determined flight trajectory. The flight plan trajectory may include operating the UAV 104 to perform a load lift procedure, wherein the UAV 104 takes off, elevating to an initial operating height 411, as well as navigating to a predetermined area above the cargo 102, as described in the method 200 of FIG. 6.

At location 410, the UAV 104 hovers at the initial operating height, which is less than the length of the cable 140 used to couple the cargo 102 to the UAV 104, such that the UAV 104 does not support the cargo 102 during take-off. Sensors, such as the sensors 160 described with reference to FIG. 1A, may be used to obtain and relay information to the control unit 170 or the remote control system 175 concerning the position of the UAV 104 relative to the cargo 102. The control unit 170 then determines whether the UAV 104 is positioned within a predetermined area above the cargo 102, and if so, the UAV proceeds to elevate above the initial operating height, and fly along the planned flight trajectory 412. The flight trajectory 412 includes a descent portion 414, and at a target location 416 the UAV 104 returns to a flight position that is lower to the ground, and which may be at the same height as or similar to the height of the UAV 104 at location 410. For example, when the UAV 104 is at the target location 416, the UAV 104 may proceed to navigate to a position 430 above a cargo drop area 432 having a cargo release height 434 that is less than the predetermined length 141 of the sling cable 140. Once the UAV 104 is determined to be located at the position 430, the control unit 170 may execute instructions to perform a cargo set down procedure. The cargo set down procedure comprises executing instructions to open the latch on the attachment device 130 holding the cable 140, effectively releasing the cable 140 and associated cargo 102 from the UAV 104. In some embodiments, the cargo 102 may be released to land on the ground, an airbag that is positioned on the ground, or another landing mechanism configured to cushion the cargo 102. After releasing the cable 140 and cargo 102, the UAV 104 proceeds to navigate to a location suitable for landing.

In some embodiments, the control unit 170 is configured to control the laterally-arranged rotors 105 to cause the airborne UAV 104 to descend towards the target location 416 until one or more sensors determine that the cargo 102 has contacted the destination landing surface at target location 416, and is further configured to control the electronically-controllable attachment devices 130 to release the sling cable 140 such that the cargo 102 and sling cable 140 are detached from the UAV 104.

Figure 16B:
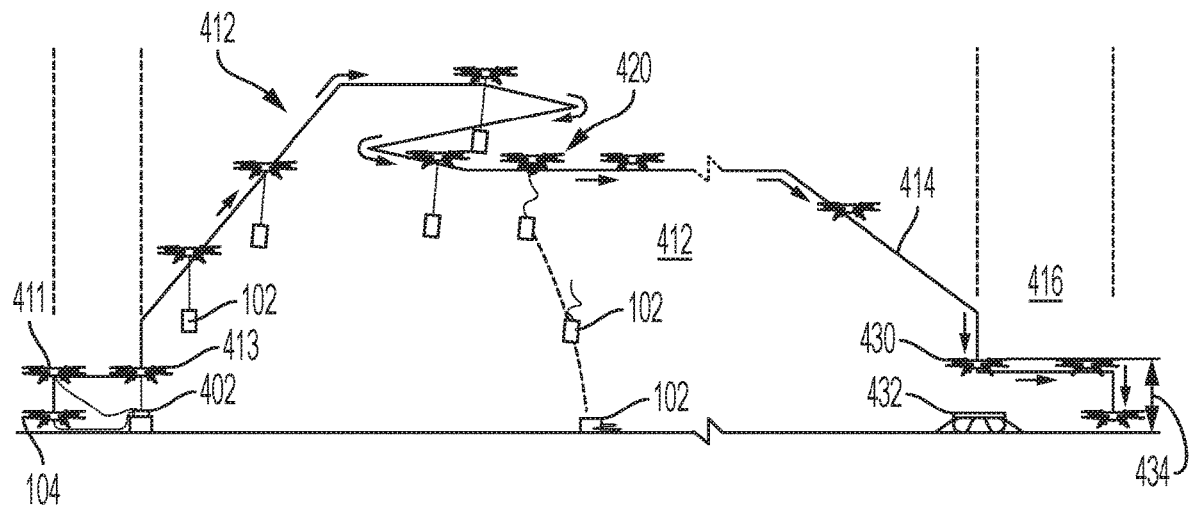
FIG. 16B illustrates a mission operation in which a manual trigger is used for detaching cargo of the system of FIG. 1A, according to an example implementation.

Optionally, the control unit 170 may be configured to receive a manual input from an operator to maneuver the release of cargo in flight to a designated cargo drop area. FIG. 16B illustrates a mission operation in which a manual trigger is used for detaching cargo of the system of FIG. 1A, according to an example implementation. As shown in FIG. 16B, the UAV 104 initially couples to cargo 102, takes off, and elevates to an initial operating height 413, similarly as described with reference to FIG. 16A. The UAV 104 then proceeds to elevate, flying along the planned trajectory 412. At any point during the planned trajectory 412, an operator manually triggers a release mechanism to release the cable 140 with attached cargo 102 from the attachment device 130; one example of such a release action is shown at location 420. The cable 140 and the cargo 102 then descend to the ground, while the UAV 104 proceeds to navigate in the air in accordance with the planned trajectory 412, descending in accordance with the descent portion 414 of the trajectory 412 and hovering low to the ground, until the UAV 104 finally lands.

Figure 16C:
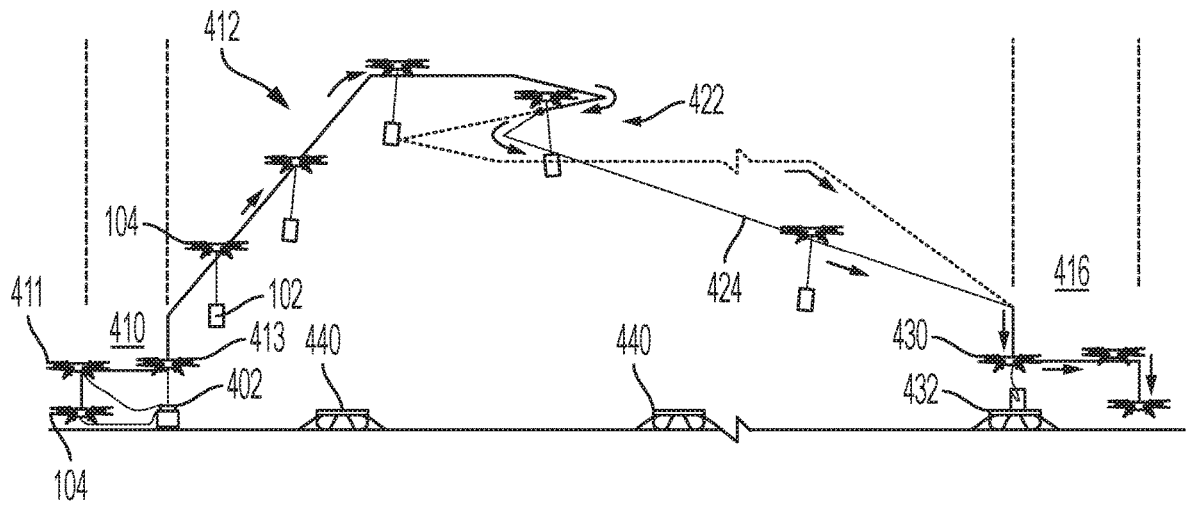
FIG. 16C illustrates a first contingency operation for detaching cargo of the system of FIG. 1A, according to an example implementation.

FIG. 16C illustrates a first contingency operation for detaching cargo of the system of FIG. 1A, according to an example implementation. A mission profile may be defined for a predetermined flight trajectory that comprises a plurality of predetermined contingent landing sites 440 along the travel path to the target location. The predetermined contingent landing sites 440 may each comprise a cargo recovery system. In some example embodiments, the cargo recovery system includes one or more airbags. As shown in FIG. 16C, the UAV 104 initially couples to the cargo 102, takes off, and elevates to an initial operating height 413, similarly as described with reference to FIG. 16A. At some point during the planned trajectory, for example, at location 422, an abort to planned zone signal is issued to the UAV 104, and the UAV 104 then changes course from the predetermined flight trajectory to fly more directly to a planned target location; this contingency trajectory is shown at path 424. In the scenario depicted in FIG. 16C, the UAV 104 retains the cargo 102 until the UAV 104 reaches a low to the ground, hovering position above the planned target location, within which is a cargo drop area, at which point the attachment device 130 releases the cable 140 with attached cargo 102; this release action is shown at location 420. The cable 140 and the cargo 102 then descend to the ground, while the UAV 104 proceeds to navigate in the air in accordance with the contingency trajectory, descending and hovering low to the ground at the target location 416, which may be at the same height as or similar to the height of the UAV 104 at location 410. Once the UAV 104 is positioned at the target location 416, the control unit 170 may execute instructions to open the latch on the attachment device 130 holding the cable 140, effectively releasing the cable 140 and associated cargo 102 from the UAV 104. After releasing the cable 140 and cargo 102, the UAV 104 proceeds to navigate to a location suitable for landing.

Figure 16D:
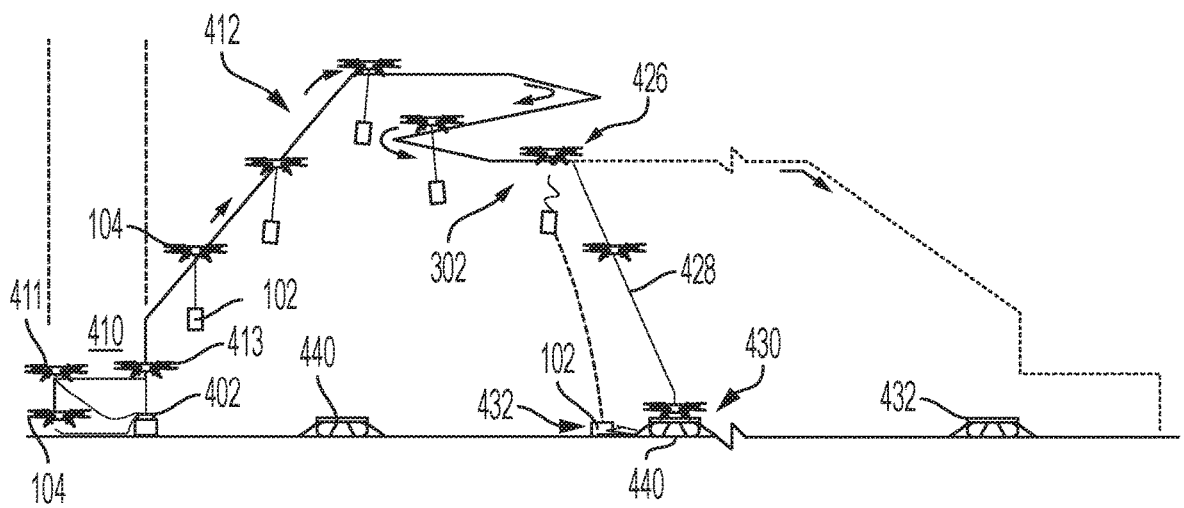
FIG. 16D illustrates a second contingency operation for detaching cargo of the system of FIG. 1A, according to an example implementation.

FIG. 16D illustrates a second contingency operation for detaching cargo of the system of FIG. 1A, according to an example implementation. As shown in FIG. 16D, the UAV 104 initially couples to the cargo 102, takes off, and elevates to an initial operating height 413, similarly as described with reference to FIG. 16A. At some point during the predetermined flight trajectory, for example, at location 426, a land now signal is issued to the UAV 104, and the UAV 104 then changes course from the predetermined flight trajectory to fly more directly to the ground; this contingency trajectory is shown at path 428. In the scenario depicted in FIG. 16D, the UAV 104 releases the cable 140 holding the cargo 102 to deliver the cargo 102 to one of the contingent landing sites 440 upon receipt of the land now signal, and proceeds to navigate toward the nearest ground location 430 on which the UAV 104 can successfully land. The cargo 102 is also shown as having landed at the one of the contingent landing sites 440.

Within examples, methods and system described herein can be used to remotely attach sling-loaded cargo to a UAV and thereafter release the cargo, either upon completion of a mission profile or in a contingency action. Such methods and systems render attachment and release self-operable so that it is not necessary to employ a ground crew to manipulate the latch to engage or disengage from a load. Examples of the disclosure may find use in a variety of potential applications, particularly in the transportation industry and for any mission in which transporting sling-loaded cargo is desired.

In other embodiments, the methods and systems described herein would also be beneficial for use with a manned aerial vehicle, or where a grounds crew is present to facilitate attachment or detachment of cargo to a cable.

As used herein, the term "about" includes aspects of the recited characteristic, parameter, or value allowing for deviations or variations, including for example, tolerances, measurement error, measurement accuracy limitations and other factors known to skill in the art, and also ranges of the parameters extending a reasonable amount to provide for such variations.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A cargo attachment system for an unmanned aerial vehicle (UAV) having at least four laterally-arranged rotors, the system comprising:
    a support beam structure comprising a plurality of support beams, at least one of the plurality of support beams being affixed to an underside of the UAV, the support beam structure further comprising:
an alignment feature connected to a support beam of the plurality of support beams, the alignment feature defining a lumen; and
an electric wire having a first end and a second end and an intermediate portion between the first end and the second end, wherein the intermediate portion extends through the lumen of the alignment feature; and
an attachment device coupled to at least one of the plurality of support beams, the attachment device being electrically controllable, wherein the second end of the electric wire is connected to the attachment device and electrically couples the attachment device to a control unit on the UAV.

2. The cargo attachment system of claim 1, further comprising:
a cable having a first portion and a second portion, the first portion being releasably coupled to the attachment device and the second portion being secured to a cargo.

3. The cargo attachment system of claim 2, wherein the cable has a predetermined length of at least 25 feet.

4. The cargo attachment system of claim 2, wherein the cable is a first cable and the attachment device is a first attachment device, and the system further comprises a second cable extending from a second attachment device, the second attachment device being coupled to at least one of the plurality of support beams and being electrically controllable.

5. The cargo attachment system of claim 4, wherein the first cable and the second cable each comprise a sling cable.

6. The cargo attachment system of claim 1, wherein the plurality of support beams comprises an upper support beam affixed to the underside of the UAV and extending away from the UAV.

7. A UAV comprising:
a rotorcraft having at least four laterally-arranged rotors;
a landing gear structure affixed to an underside of the UAV;
a support beam structure comprising a plurality of support beams affixed to an underside of the UAV, wherein at least one of the plurality of support beams projects away from the landing gear structure, the support beam structure further comprising:
an alignment feature connected to a support beam of the plurality of support beams, the alignment feature defining a lumen; and
an electric wire having a first end and a second end and an intermediate portion between the first end and the second end, wherein the intermediate portion extends through the lumen of the alignment feature; and
an attachment device coupled to at least one of the plurality of support beams, the attachment device being electrically controllable, wherein the second end of the electric wire is connected to the attachment device and electrically couples the attachment device to a control unit on the UAV.

8. The UAV of claim 7, further comprising:
a cable having a first portion and a second portion, the first portion being releasably coupled to the attachment device and the second portion being secured to a cargo.

9. The UAV of claim 8, wherein the attachment device is a first attachment device and the cable is a first cable, and the UAV further comprises a second cable extending from a second attachment device, the second attachment device being coupled to at least one of the plurality of support beams and being electrically controllable.

10. The UAV of claim 9, further comprising a plurality of lateral arresting cable portions extending between the first cable and the second cable to prevent interference of the first cable or the second cable with the landing gear structure.

11. The UAV of claim 10, wherein the plurality of support beams comprises a first support beam affixed to the underside of the UAV and extending away from the UAV, a second support beam attached to the first support beam at a first end and to the landing gear structure at a second end.

12. The UAV of claim 11, wherein the plurality of support beams further comprises a third support beam affixed to the first support beam at a first end and to the landing gear structure at a second end, and a fourth support beam extending between the second support beam and the third support beam.

13. The UAV of claim 11, wherein the first attachment device and the second attachment device are each electrically controllable to open and close so as to be releasably coupled to the first cable and the second cable.

14. The UAV of claim 9, wherein the first cable and the second cable each comprise a sling cable.

15. The UAV of claim 8, wherein the control unit has instructions stored in memory that are executed by a processor to perform functions of:
coupling the attachment device to the first portion of the cable;
operating the at least four laterally-arranged rotors on the UAV to cause the UAV to elevate to an initial operating height, the initial operating height being less than a length of the cable such that that UAV does not support the cargo;
operating the rotors to further elevate the UAV and controlling navigation of the UAV; and
releasing the first portion of the cable from the attachment device.

16. The UAV of claim 8, wherein the cable has a predetermined length of at least 25 feet.

17. An unmanned aerial vehicle (UAV) comprising:
a rotorcraft having at least four laterally-arranged rotors;
a landing gear structure affixed to an underside of the UAV;
a support beam structure comprising a plurality of support beams affixed to an underside of the UAV, wherein at least one of the plurality of support beams projects away from the landing gear structure;
a first attachment device coupled to at least one of the plurality of support beams, the first attachment device being electrically controllable;
a first cable having a first portion and a second portion, the first portion being releasably coupled to the first attachment device and the second portion being secured to a cargo;
a second attachment device coupled to at least one of the plurality of support beams, the second attachment device being electrically controllable; and
a second cable extending from the second attachment device to the cargo,
wherein the first attachment device and the second attachment device are each electrically controllable to open and close so as to be releasably coupled to the first cable and the second cable.

18. The UAV of claim 17, further comprising:
a plurality of lateral arresting cable portions extending between the first cable and the second cable to prevent interference of the first cable or the second cable with the landing gear structure.

19. The UAV of claim 17, wherein the plurality of support beams comprises a first support beam affixed to the underside of the UAV and extending away from the UAV, and a second support beam attached to the first support beam at a first end and to the landing gear structure at a second end.

20. The UAV of claim 17, further comprising:
a control unit having instructions stored in memory that are executed by a processor to perform functions of:
operating the at least four laterally-arranged rotors on the UAV to cause the UAV to elevate to an initial operating height, the initial operating height being less than a length of the first cable such that that UAV does not support the cargo;
operating the rotors to further elevate the UAV and controlling navigation of the UAV; and
releasing the first cable from the first attachment device and releasing the second cable from the second attachment device.

\* \* \* \* \*